United States Patent [19]

Klein

[11] Patent Number: 4,750,790

[45] Date of Patent: Jun. 14, 1988

[54] ANTI-LOCK HYDRAULIC BRAKE SYSTEM FOR VEHICLES WITH BYPASS LINE AND RELIEVING DEVICE

[75] Inventor: Hans-Christof Klein, Hattersheim, Fed. Rep. of Germany

[73] Assignee: Alfred Teves GmbH, Frankfurt Main, Fed. Rep. of Germany

[21] Appl. No.: 944,242

[22] Filed: Dec. 18, 1986

[30] Foreign Application Priority Data

Dec. 20, 1985 [DE] Fed. Rep. of Germany ....... 3545236

[51] Int. Cl.$^4$ .......................... B60T 8/32; B60T 8/42
[52] U.S. Cl. .................................. 303/115; 303/110; 303/114; 303/119
[58] Field of Search ............................... 303/113–119, 303/61–63, 68–69, 6 R, 6 C, 110; 188/181, 355–359

[56] References Cited

U.S. PATENT DOCUMENTS

| | | | |
|---|---|---|---|
| 3,477,765 | 11/1969 | Perrino | 303/115 |
| 3,552,802 | 1/1971 | Packer et al. | 303/115 |
| 3,756,664 | 9/1973 | Schlitz et al. | 303/115 |
| 3,788,710 | 1/1974 | Von Grunberg et al. | 303/115 |
| 3,790,228 | 2/1974 | Adahan | 303/115 |
| 3,901,559 | 8/1975 | Inada | 303/115 |
| 4,063,785 | 12/1977 | Tribe | 303/115 |
| 4,066,301 | 1/1978 | Harries | 303/115 |
| 4,647,114 | 3/1987 | Schuett et al. | 303/6 C |

FOREIGN PATENT DOCUMENTS 2340247 2/1974 Fed. Rep. of Germany .
2617726 11/1976 Fed. Rep. of Germany .
2908482 10/1980 Fed. Rep. of Germany .
2009348 6/1979 United Kingdom .
2163821 3/1986 United Kingdom .

Primary Examiner—Douglas C. Butler
Attorney, Agent, or Firm—James R. Raden; Robert P. Seitter

[57] ABSTRACT

An anti-lock hydraulic brake system for vehicles incorporating a master cylinder (21) and wheel brakes, (30, 31) connected to the master cylinder (21) through connecting lines (32, 34), as well as an anti-lock apparatus having sensors for the associated wheel brakes (30, 31) by which, in the event of excessive deceleration of a vehicle wheel, the wheel brake will be disconnected from the master cylinder (21) by a valve (11) and will be connected to a relieving device. The relieving device is composed of a slave cylinder (1), whose piston (2) is in operative engagement with a movable wall of an actuating device operating with vacuum, which movable wall is displaceable to assume a control position in opposition to the force of a resilient element, for example a steel spring, the piston chamber (44) in front of the piston (2) being connected via a by-pass line (35) which contains a valve (23) with the brake line (32, 34) communicating with the intermdeiate chamber (45) of a separating valve (11). The valve member (12) of the separating valve (11) is actuatable by the piston (2), while the pressure in the cylinder chamber of the vacuum cylinder housing is variable through a valve so that the movable wall is movable to and fro together with the piston (2).

6 Claims, 4 Drawing Sheets

U.S. Patent    Jun. 14, 1988    Sheet 1 of 4    4,750,790
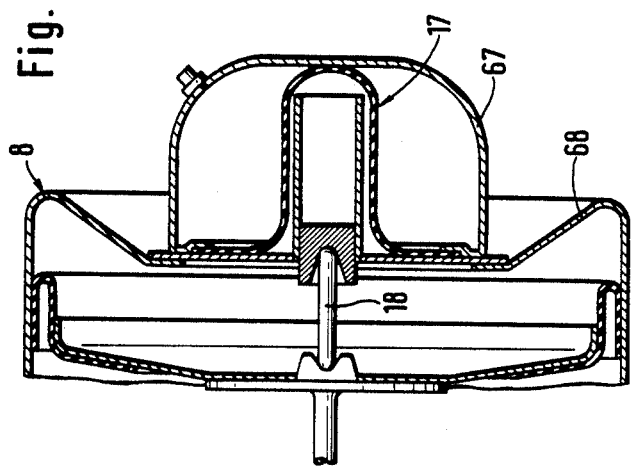
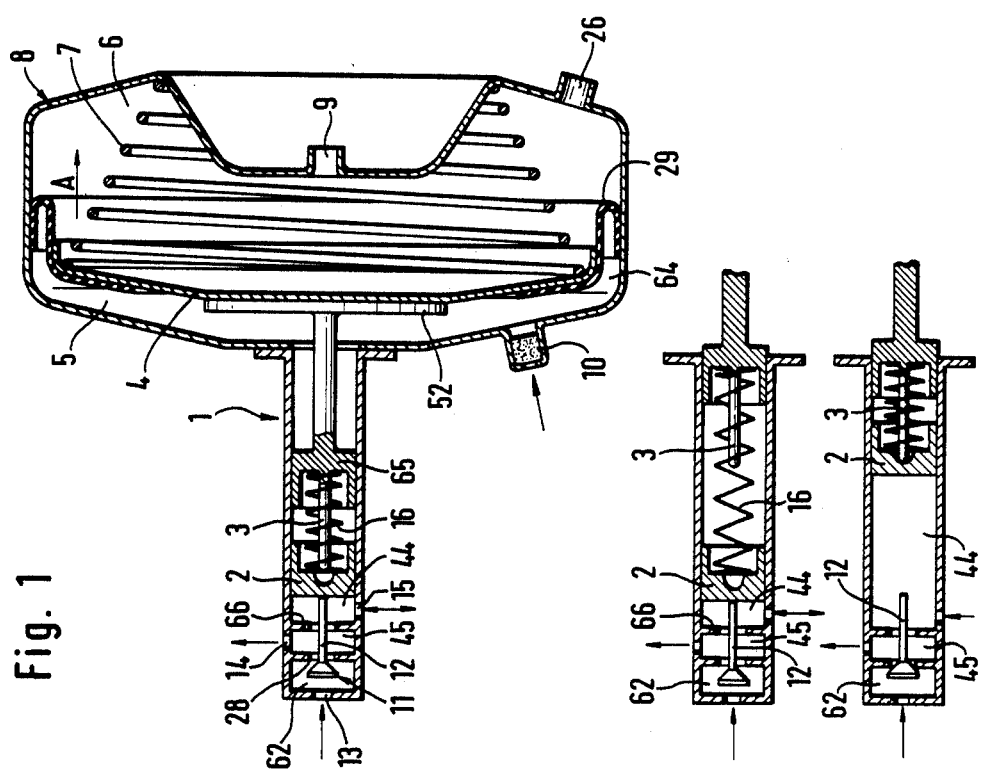
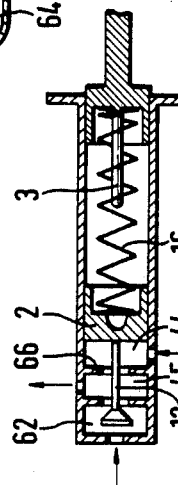
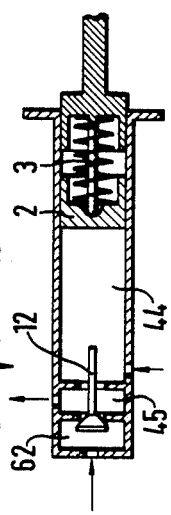

ANTI-LOCK HYDRAULIC BRAKE SYSTEM FOR VEHICLES WITH BYPASS LINE AND RELIEVING DEVICE

BACKGROUND OF THE INVENTION

The present invention relates to an anti-lock hydraulic brake system for vehicles incorporating a master cylinder and at least one wheel brake connected to the master cylinder. An anti-lock apparatus is provided having sensors for the associated wheel brakes by which, in the event of excessive deceleration of a vehicle wheel, the vehicle wheel will be blocked in relation to the master cylinder by means of a valve and will be connected to a relieving device.

A device for hydraulic brake systems with anti-lock control is known (p 29 08 482.0-21) having a piston sealingly slidable in a bore which, on the one hand, confines an inlet chamber connected to a master cylinder and, on the other hand, confines an outlet chamber communicating with at least one wheel cylinder. The piston includes a passage closable by a valve member and connecting the inlet chamber to the outlet chamber. The valve memer in the final position of the piston, in which the outlet chamber has its smallest volume, is mechanically held open, and the piston is slidable by means of a control piston confining a control chamber for the purpose of enlarging the outlet chamber. A reaction piston designed as a stepped piston confines the inlet chamber, the smaller application surface of the reaction piston facing the inlet chamber and the larger application surface bounding a reaction chamber which is in direct communication with a pressure fluid reservoir. The control piston is arranged on the inlet chamber side of the piston and is connected with same by means of a piston shaft. The control piston confines the reaction chamber and a spring disposed in the control chamber preloads the control piston and the piston in the direction of the outlet chamber, and the reaction piston is arranged on the piston shaft slidably in relation thereto.

In addition to an additional pressure-fluid supply reservoir, this known hydraulic brake system necessitates a pump driven by a motor and a special pressure accumulator, thence permitting to be mounted on comparatively expensive vehicles only. Therefore, it is the object of the present invention to devise an anti-lock hydraulic brake system for vehicles which manages without any special pressure-fluid supply system and thus lends itself to manufacture at particularly low costs.

SUMMARY OF THE INVENTION

This object is achieved according to the present invention in that the relieving device is formed by a slave cylinder, whose piston is in operation engagement with a movable wall applied by pressure below atmospheric pressure, which movable wall is displaceable to assume a control position in opposition to the force of a resilient element, for instance a steel spring, the piston chamber in front of the piston being connected with a by-pass line. The brake lines communicate with an intermediate chamber which, by way of a separating valve, is connectible to the inlet chamber communicating with the master cylinder, the valve member of the separating valve being actuatable by the piston.

Preferably, the movable wall is designed such as to isolate two cylinder chambers from one another, the one cylinder chamber communicating with the atmosphere through a vent hole and the other cylinder chamber being connected to a pressure source, and with the pressure in the cylinder chamber being variable through a valve so that the movable wall is movable to and fro in dependence upon the difference of pressures prevailing in the two cylinder chambers. Expediently, the push rod coupled to the movable wall comprises a collar or flange on which the one end of a retaining spring is abutting, whose other end is supported on the piston, the retaining spring seeking to displace the piston in the direction of the partition wall which confines the piston chamber on the side of the valve. In a preferred embodiment, the movable wall comprises a connecting member or a tappet on its side remote from the slave cylinder, by which it takes support on a hydraulic gas spring, whose housing is rigidly connected to the one housing shell of the vacuum cylinder housing, for instance is welded thereto.

Advantageously, the through-bore of the slave cylinder is closed by a valve carrier which contains two chambers, the one thereof in the capacity of an inlet chamber communicating with the master cylinder of the braking pressure generator, while the other one in the capacity of an intermediate chamber is connected to at least one wheel brake, with the wall separating the two chambers being designed as a valve seat for the valve member of the separating valve which penetrates the intermediate chamber.

A special advantage of the brake system according to the present invention resides in that its hydraulic and pneumatic components are of comparatively simple design, and in tht it permits mounting without great difficulty compared to a conventional brake system. That is, the braking pressure modulator is connectible directly with the intake manifold of the vehicle engine through a hose line. Another important advantage is provided in that in the event of failure of, for example, the modulator, the brake system remains functional. Further, the vehicle driver, when depressing the brake pedal, has in his foot about the same feeling for the braking action as in the case of an entirely intact anti-lock apparatus.

BRIEF DESCRIPTION OF THE DRAWING

The present invention permits most various embodiments; some thereof are schematically illustrted in the accompanying drawings. In the drawings, FIG. 1 is a longitudinal cross-section of a pressure modulator;

FIG. 2 is a part of the vacuum cylinder housing of an alternative embodiment incorporating a hydraulic gas spring;

FIG. 3 is the diagrammatic view of the slave cylinder of the pressure modulator according to FIG. 1 in the standard braking mode;

FIG. 4 is the salve cylinder according to FIG. 3 in the control position;

DETAILED DESCRIPTION

Figure 5:
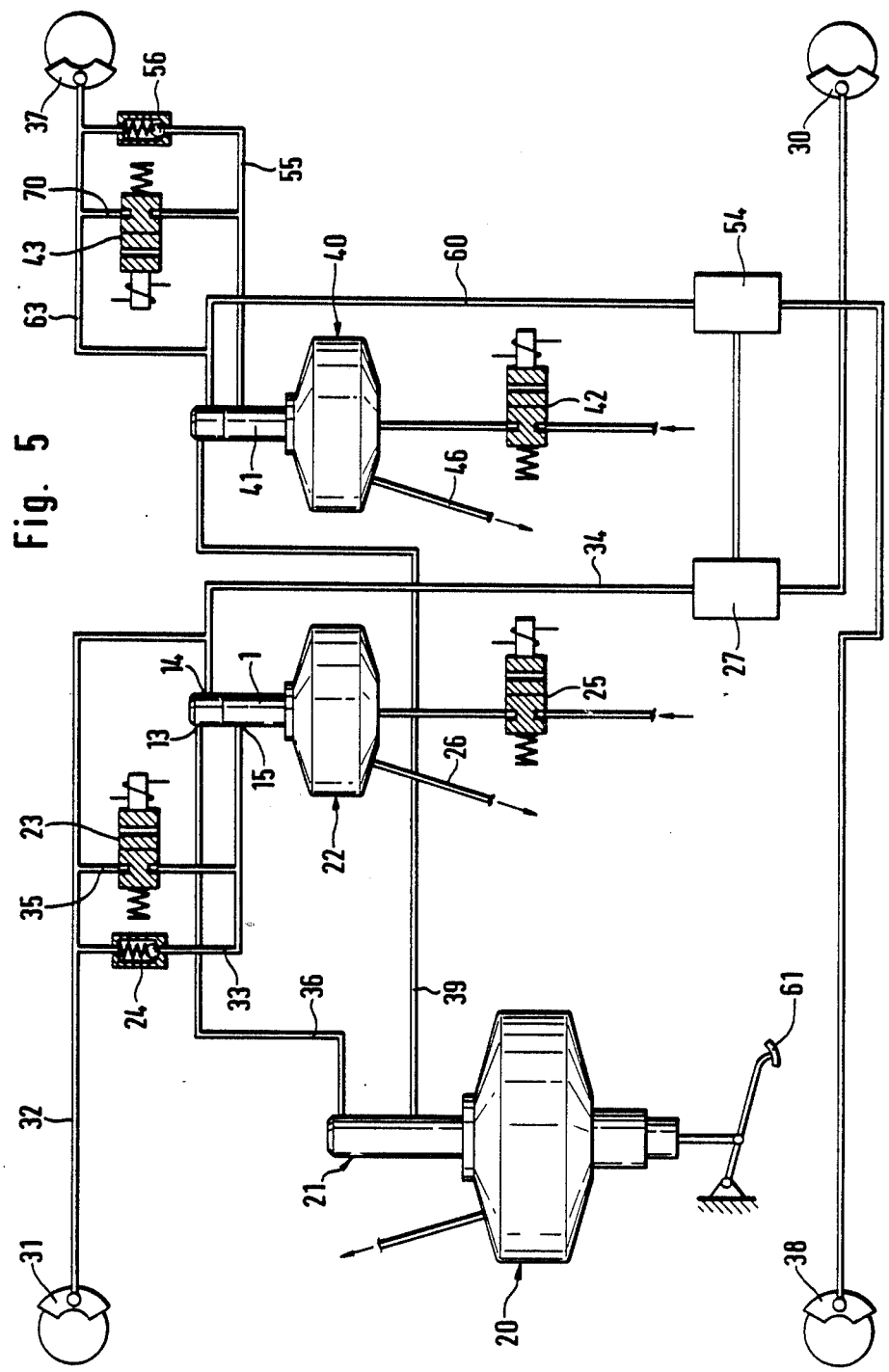
FIG. 5 is the wiring diagram of a dual-circuit brake system incorporating two pressure modulators.

The pressure modulator according to FIG. 1 is composed of the slave cylinder 1 in whose longitudinal bore the piston 2 is floatingly accommodated which, on its end remote from the push rod 3 of the movable wall 4, abuts on the valve member 12 which forms a separating valve 11 in conjunction with a valve seat 28 arranged on the slave-cylinder housing. The modulator includes a resetting spring 7 clamped into a vacuum cylinder housing 8 containing a connecting socket for the outside air, a rolling diaphragm 29 sealing the movable wall 4 reltive to the vacuum cylinder housing 8 as well as a retaining spring 16 clamped in between the piston 2 and the push rod 3.

FIG. 1 depicts the modulator in its initial position, the slave cylinder 1 communicating via the ports 13, 14 (as can be seen from FIG. 5) with the master cylinder 21 of the power brake booster 20 and, respectively, with one rear-wheel brake 30 and with one front-wheel brake 31. FIG. 5 shows that a portion of the brake line 32 leading from the slave cylinder 1 to the front-wheel brake 31 is connected to the brake line 34 leading to the rear-wheel brake 30 and, besides, communicates with the piston chamber 44 of the slave cylinder 1 via a by-pass line 35 in which a two-way/two-position directional control valve 23 is inserted.

FIG. 5 illustrates a brake system designed with two circuits, the one brake circuit comprising the brake 31 of the left front wheel and the brake 30 of the right rear wheel, while the other brake circuit comprises the brake 37 of the right front wheel and the brake 38 of the left rear wheel. Each of the two brake circuits incorporates a pressure modulator 22 and 40, respectively, of its own, whose slave cylinder 1 and 41, respectively, is in each case through a connecting line 36 and 39, respectively, in communication with one of the two pressure chambers of the tandem master cylinder 21 of the vacuum brake power booster 20. Connected upstream of each of the two pressure modulators 22, 40 is an electromagnetically actuatable air-pressure control valve 25 and 42, respectively, which is connected with the port 9 (FIG. 1) of the vacuum cylinder housing 8 of the corresponding pressure modulator 22 and 40, respectively, and controls the introduction of air into the cylinder chamber 6 in response to an electric signal, for which purpose the magnet of the respective air-pressure control valve 25 and 42, respectively, is connected with a vehicle-wheel slip and monitoring electronics not illustrated in more detail.

In the initial position of the pressure modulator (FIG. 1), atmospheric pressure prevails in the cylinder chamber 6 and in the air chamber 5 of each pressure modulator 22 and 40, respectively, so that the separating valve 11 is forced to be open due to the position of the piston 2. In this arrangement, the resetting spring 7 is dimensioned such as to not allow this separating valve 11 to close in the event of vacuum failure.

When the pressure modulator 22 and 40, respectively, is in its basic position (see FIG. 3), that is in the standard braking mode, the cylinder chamber 6 is evacuated and the resetting spring 7 is biassed, the piston 2 is retained in its initial position merely by the weak retaining spring 16. The separating valve 11 remains opened as long as the two-way/two-position directional control valve 23 and 43, respectively, is not actuated and the piston chamber 44 is practically unpressurized. After actuation of the directional control valve 23 and 43, respectively, like pressures will develop in the chambers 44, 45, while the piston 2 is displaced to the right in the direction of the vacuum cylinder housing 8 so that the separating valve 11 closes and the pressure drops in the wheel brakes 30, 31 and 37, 38 respectively (see FIG. 4). The magnitude of the pressure drop in the chambers 44, 45 is determined by the directional control valve 23 and 43, respectively. As the fluid under pressure which flows back from the wheel brakes is required to move only the relatively small and light-weight piston 2 in opposition to the low force of the retaining spring 16, pressure decrease takes place very quickly.

Re-build-up of the hydraulic pressure in the wheel brakes 30, 31 and 37, 38, respectively, takes place by ventilating the cylinder chamber 6 via the associated air-pressure control valve 25 and 42, respectively (see FIG. 5). It depends on the capacity of the auxiliary-energy source, whether the vacuum-connecting line 26 and 46, respectively, is directly connected to the cylinder chamber 6 by the intermediary of a throttle or whether an additional shut-off valve must be inserted into the vacuum-connecting line 26 and 46, respectively.

The characteristic curve of the resetting spring 7 which is supported on the movable wall 4 must be comparatively flat, for which reason likewise a hydraulic gas spring 17 can be provided instead of a steel spring, as is shown in FIG. 2. In this instance, a special gas spring housing 67 is rigidly connected to the housing shell 68, while an elastic diaphragm isolates the gas chamber from the chamber filled with the fluid. The tappet 18 will then cooperate with a piston which is acted upon by the fluid under pressure.

Figure 6:
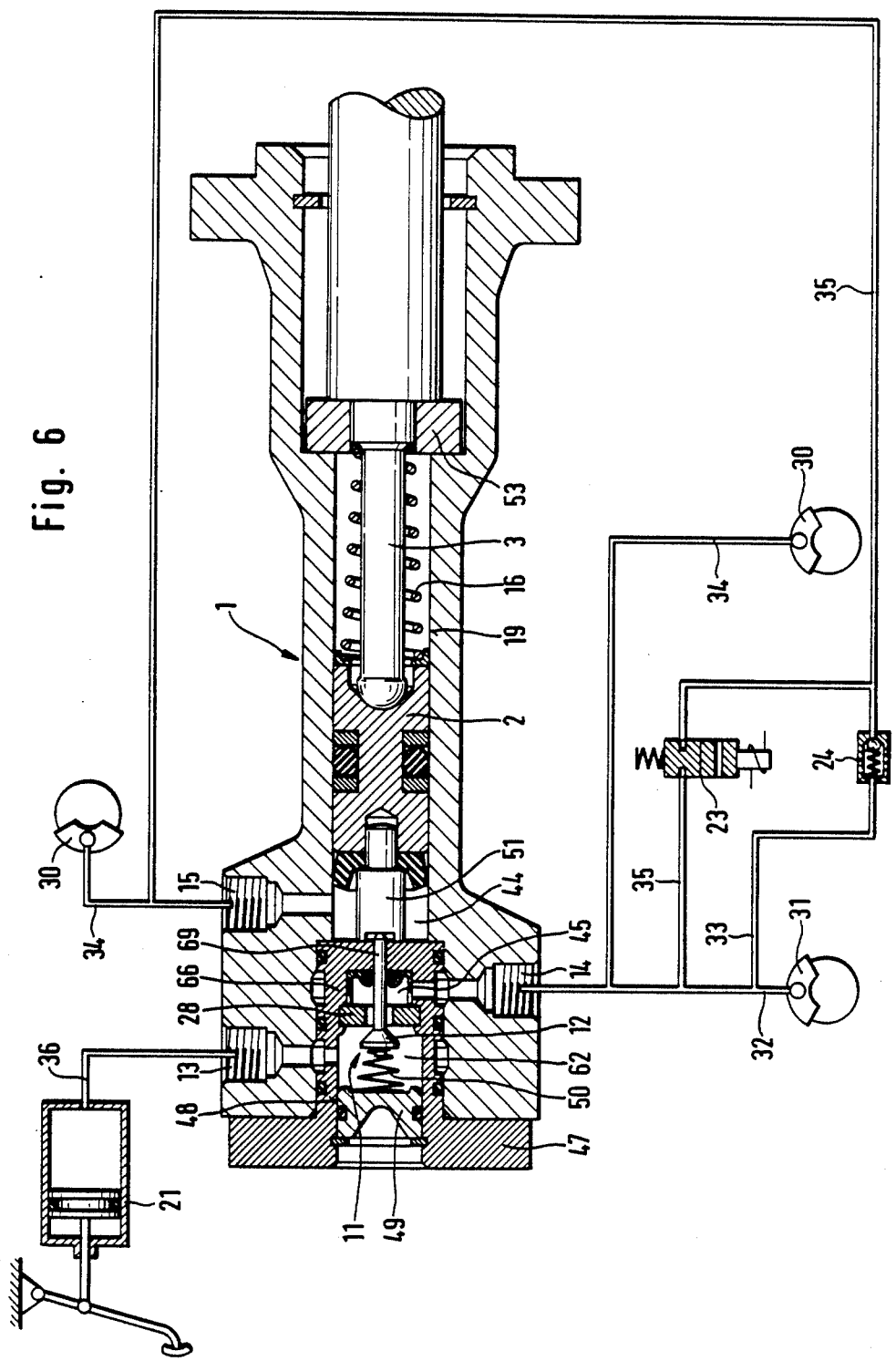
FIG. 6 is the longitudinal cross-section through a constructive embodiment of a slave cylinder; and, FIG. 7 is the wiring diagram of a dual-circuit brake system incorporating a pressure-difference limiter in the rear-axle brake circuit.

FIG. 6 displays in more detail the constructive design of the hydraulic part of the pressure modulator 22 and 40, respectively. The slave cylinder 1 contains a through-bore 19 which is closed by means of a valve carrier 47. In turn, valve carrier 47 is provided with a stepped bore 48 which is closed by a plug 49 on which the closure spring 50 of the separating valve 11 is supported. The valve member 12 of the separating valve 11 is longitudinally slidably accommodated in the stepped bore 48 of the valve carrier 47, the one end of the valve member 12 projecting into the piston chamber 44 and abutting on the spacer 51 of the piston 2. Said piston 2 cooperates with a push rod 3 whose enlarged end comprises a flange 52 (FIG. 1) which is rigidly connected to the movable wall 4. In the case of a roughly centric position of the push rod 3 in the slave cylinder 1, after separation of the push rod 3 from the piston, guiding of the push rod 3 will be taken care of by a ring 53, shrink-fitted on the push rod 3, in the longitudinal bore of the slave cylinder 1.

For a vehicle with a diagonal allotment of brake circuits, FIG. 5 illustrates a suitable combination of two pressure modulators 22, 40 with a vacuum brake power booster 20 with tandem master cylinder 21, with the directional control valves 23, 43, the air-pressure control valves 25, 42 and two axle-load-responsive brake force control valves 27, 54. Non-return valves 24, 56 inserted into the branch lines 33 and 55 ensure that the modulators 22, 40 will be able to assume their initial positions (FIG. 1) even in the event of failure of the directional control valves 23, 43.

The brake system according to FIG. 5 operates as follows. Upon depression of the brake pedal 61, the two working chambers of the tandem master cylinder 21 will be exposed to pressure which propagates through the connecting lines 36, 39 until into the inlet chambers 62 of the slave cylinders 1, 41 of the pressure modulators 22, 40. As the inlet chamber 62 of each pressure modulator 1 and 41, respectively, communicates by way of an opened separating valve 11 with the intermediate chamber 45, to which the brake lines 32, 34 and 63, 60 leading to the brakes 31, 30 and 37, 38 are respectively connected, the same amount of pressure will develop in the front-axle brake circuits like in the two brake circuits of the rear-axle brakes, since the brake lines 34 and 60, respectively, are connected to the brake lines 32 and 63, respectively, for the front wheels 31 and 37, respectively. When now the slip-monitoring electronics detects the imminent locked condition of a vehicle wheel 30, 31 and 37, 38, respectively, the corresponding directional control valves 23 and 43, respectively, and air-pressure control valves 25 and 42, respectively, will be changed over so that the pressure below atmospheric pressure developing in the cylinder chamber 6 of the respective vacuum cylinder housing 8 will cause the movable wall 4 and thus the push rod 3 to return to its position illustrated in FIG. 4 (direction of arrow A according to FIG. 1), until the separating valve 11 interrupts the pressure-fluid connection between the inlet chamber 62 and the intermediate chamber 45. Since also the directional control valve 23 and 43, respectively, has switched from its closed position to its opened position, now pressure fluid is permitted to return from the brake lines 32, 63 and 34, 60, respectively, into the piston chamber 44 of the respective pressure modulator 22 and 40, respectively, in consequence whereof the pressure in the wheel brakes 30, 31 and 37, 38, respectively, will be decreased. Depression of the brake pedal 61 through its full travel is precluded in the phase of operation described, since the closed separating valve 11 prevents the supply of pressure fluid out of the tandem master cylinder 21. When, after pressure decrease has been performed, the valves 25 and 42, respectively, and the directional control valves 23 and 43, respectively, are switched to re-assume their switch positions illustrated in FIG. 5, the braking pressure that previously existed will prevail again in the brake lines 32, 34 and 63, 60 respectively.

Figure 7:
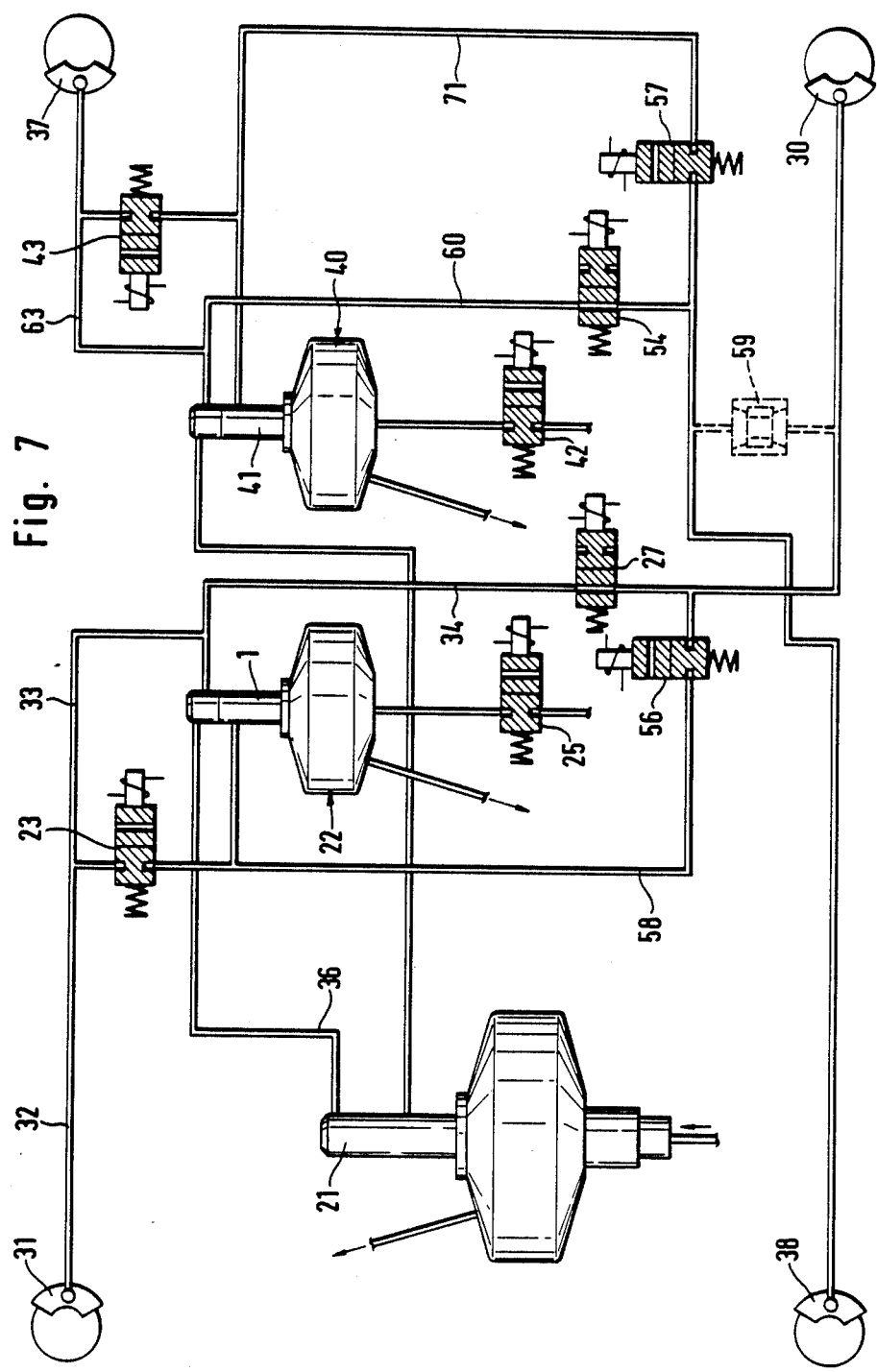

FIG. 7 shows the wiring diagram of a brake system, wherein in each case one single brake force regulator 27 and 54, respectively, takes care of the load-responsive brake force distribution for both brake circuits, while another valve 56 and 57, respectively, provides for a split-up into several pressure tracks per brake circuit which are isolated from one another. That is to say, these are the connecting line 36 from the master cylinder 21 to the pressure modulator 22, the brake line 32 to the wheel brake 31, the brake line 34 to the wheel brake 30 and the branch line 58 interconnecting the brake lines 32 and 34. The pressure track formed by the branch line 58 (modulator track) can be connected simultaneously or consecutively to each of the two wheel-cylinder tracks 32 and 34, respectively, by the hydraulic multiplex method.

In order to prevent a predetermined difference of pressure between the brake circuits 34, 60 of the two rear-wheel brakes 30 and 38, respectively, being exceeded, a pressure-difference limiter 59 is inserted between the two brake lines 34 and 60. This pressure-difference limiter 59 can be composed of a valve with a floatingly supported spring-centered piston, with the two piston chambers of the valve into which the piston is plunging permitting to effect a limited balance of volume. Moreover, the brake system according to FIG. 7 manages without the two non-return valves 24 and 56 of the brake system of FIG. 5, since total brake-circuit failure may occur only in the event of simultaneous failure of more than one of the directional control valves 23 and 43, respectively.

What is claimed is:

1. An anti-lock hydraulic brake system for an automotive vehicle having vehicle wheels and wheel brakes, said system comprising, in combination:
   a master cylinder having a working chamber connected to said wheel brakes;
   a pressure relieving device including a vacuum cylinder and an adjacent slave cylinder, said cylinders operatively coupled together by a piston rod extending between said cylinders;
   said slave cylinder including a piston chamber for receiving a piston connected to said piston rod, said slave cylinder including an inlet chamber connected to said working chamber, and said slave cylinder including an intermediate chamber located between said piston chamber and inlet chamber and being connected to said wheel brakes;
   a by-pass line connected between said piston chamber and intermediate chamber, said by-pass line having a one-way valve connected therein permitting fluid flow from said intermediate chamber to said piston chamber;
   a normally closed valve connected across said one-way valve to by-pass said one-way valve when said normally closed valve is actuated into its open position; and,
   a separating valve including a valve seat and a valve member, said separating valve connecting said inlet and intermediate chambers of said slave cylinder when said piston is translated toward said valve member and closing the connection between said inlet and intermediate chambers when said piston is translated away from said valve member.

2. The brake system according to claim 1, wherein the pressure in said intermediate chamber and said piston chamber is equalized and said connection between said inlet and intermediate chambers is closed when said normally closed valve is actuated into its open position in response to a slip control signal to decrease braking pressure in said wheel brakes.

3. The brake system according to claim 1, including a second normally closed valve connected between said vacuum cylinder and a source of air for introducing air into said vacuum cylinder in response to a control signal to open said second valve and translate said piston toward said valve member thereby to increase braking pressure in said wheel brakes.

4. The brake system according to claim 1, wherein said brake system is a dual-circuit brake system having first and second ones of said pressure relieving device respectively connected between first and second working chambers of said master cylinder and first and second rear wheel brakes, and wherein said dual-circuit brake system includes a pressure-difference limiter connected between said first and second rear wheel brakes which limits the pressure difference between said rear wheel brakes to a predetermined value.

5. The brake system according to claim 4 wherein said pressure-difference limiter comprises a valve having first and second valve piston chambers separated by a floating piston with each valve piston chamber being connected to a respective one of said rear wheel brakes.

6. The brake system according to claim 1, wherein said valve seat is formed in a wall portion separating said inlet and intermediate chambers, wherein said valve member comprises a tappet extending through said valve seat and guided in a bore of a wall portion separating said piston and intermediate chambers, and wherein said separating valve includes a spring in said inlet chamber disposed between said tappet and an end wall of said inlet chamber for resiliently urging an enlarged head portion of said tappet against said valve seat.

* * * * *